United States Patent
Liu et al.

(10) Patent No.: US 7,095,401 B2
(45) Date of Patent: Aug. 22, 2006

(54) SYSTEM AND METHOD FOR GESTURE INTERFACE

(75) Inventors: Che-Bin Liu, Urbana, IL (US); Visvanathan Ramesh, Plainsboro, NJ (US); Bernhard Geiger, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 117 days.

(21) Appl. No.: 10/001,553

(22) Filed: Oct. 31, 2001

(65) Prior Publication Data

US 2002/0118880 A1 Aug. 29, 2002

(51) Int. Cl.
*G09G 5/00* (2006.01)
(52) U.S. Cl. .................. 345/156; 715/863; 382/181
(58) Field of Classification Search ................ 345/156; 382/103, 107, 128, 153, 181, 190, 224; 348/169–172; 715/863
See application file for complete search history.

(56) References Cited

U.S. PATENT DOCUMENTS

| | | | | |
|---|---|---|---|---|
| 5,594,469 A | * | 1/1997 | Freeman et al. ............ 345/158 |
| 5,680,481 A | * | 10/1997 | Prasad et al. ............... 382/190 |
| 5,771,306 A | * | 6/1998 | Stork et al. ................ 382/100 |
| 5,875,257 A | * | 2/1999 | Marrin et al. .............. 382/107 |
| 6,002,808 A | * | 12/1999 | Freeman ..................... 382/288 |
| 6,072,494 A | * | 6/2000 | Nguyen ...................... 345/863 |
| 6,075,895 A | * | 6/2000 | Qiao et al. .................. 382/218 |
| 6,128,003 A | * | 10/2000 | Smith et al. ................ 345/157 |
| 6,191,773 B1 | * | 2/2001 | Maruno et al. ............. 345/158 |
| 6,252,599 B1 | * | 6/2001 | Natsuko et al. ............ 345/419 |
| 6,332,038 B1 | * | 12/2001 | Funayama et al. .......... 382/190 |
| 6,346,940 B1 | * | 2/2002 | Fukunaga ................... 345/427 |
| 6,501,515 B1 | * | 12/2002 | Iwamura ..................... 348/734 |
| 6,587,574 B1 | * | 7/2003 | Jeannin ...................... 382/107 |
| 6,642,940 B1 | * | 11/2003 | Dakss et al. ................ 345/723 |
| 6,674,424 B1 | * | 1/2004 | Fujioka ...................... 345/175 |

* cited by examiner

*Primary Examiner*—Jimmy H. Nguyen
(74) *Attorney, Agent, or Firm*—Michele L. Conover

(57) ABSTRACT

A method for determining a gesture includes determining a change in a background of an image from a plurality of images, determining a object in the image, determining a trajectory of the object through the plurality of images, and classifying a gesture according to the trajectory of the object.

19 Claims, 4 Drawing Sheets

SYSTEM AND METHOD FOR GESTURE INTERFACE

BACKGROUND OF THE INVENTION

1. Field of the Invention

The present invention relates to computer interfaces, and more particularly to a real-time gesture interface for use in medical visualization workstations.

2. Discussion of the Prior Art

In many environments, traditional hands-on user interfaces, for example, a mouse and keyboard, for interacting with a computer are not practical. One example of such an environment is an operating theater (OT) where there is a need for strict sterility. A surgeon, and everything coming into contact with his/her hands must be sterile. Therefore, the mouse and keyboard may be excluded from consideration as an interface because they may not be sterilized.

A computer may be used in the OT for medical imaging. The interaction can include commands to display different images, scrolling through a set of two-dimensional (2D) images, changing imaging parameters (window/level), etc. With advances in technology, there is a growing demand for three-dimensional (3D) visualizations. The interaction and manipulation of 3D models is intrinsically more complicated than for 2D models even if a mouse and keyboard can be used, because the commands may not be intuitive when working in 3D. Examples of commands in a 3D medical data visualization environment include rotations and translations including zoom.

Areas of human-machine interaction in the OT include, for example, voice recognition and gesture recognition. There are several commercial voice recognition systems available. In the context of the OT, their advantage is that the surgeon can continue an activity, for example, a suture, while commanding the imaging system. However, the disadvantage is that the surgeon needs to mentally translate geometric information into language: e.g., "turn right", "zoom in", "stop". These commands need to include some type of qualitative information. Therefore, it can be complicated and tiresome to achieve a specific 3D orientation. Other problems related to voice recognition are that it may fail in a noisy environment, and the system may need to be trained to each user.

Researchers have attempted to develop systems that can provide a natural, intuitive human-machine interface. Efforts have been focused on the development of interfaces without mouse or device based interactions. In the OT, the need for sterility warrants the use of novel schemes for human-machine interfaces for the doctor to issue commands to a medical imaging workstation.

Gesture recognition includes two sequential tasks, feature detection/extraction and pattern recognition/classification. A review of visual interpretation of hand gestures can be found in V. I. Pavlovic, R. Sharma, and T. S. Huang, "Visual interpretation of hand gestures for human-computer interaction, A Review", IEEE Transactions on Pattern Analysis and Machine Intelligence, 19(7):677–695,July 1997.

For feature detection/extraction, applications may use color to detect human skin. An advantage of a color-based technique is real-time performance. However, the variability of skin color in varying lighting conditions can lead to false detection. Some applications use motion to localize the gesture. A drawback of a motion cue approach is that assumptions may be needed to make the system operable, e.g., a stationary background and one active gesturer. Other methods, such as using data-gloves/sensors to collect 3D data, may not be suitable for a human-machine interface because they are not natural.

For pattern recognition and classification, several techniques have been proposed. Hidden Markov Model (HMM) is one method. HMM can be used for, for example, the recognition of American Sign Language (ASL). One approach uses motion-energy images (MEI) and motion-history images (MHI) to recognize gestural actions. Computational simplicity is the main advantage of such a temporal template approach. However, motion of unrelated objects may be present in MHI.

Neural networks are another tool used for recognition. In particular, a time-delay neural network (TDNN) has demonstrated the capability to classify spatio-temporal signals. TDNN can also be used for hand gesture recognition. However, TDNN may not be suitable for some environments such as an OT, wherein the background can include elements contributing to clutter.

Therefore, a need exists for a system and method for a real-time interface for medical workstations.

SUMMARY OF THE INVENTION

According to an embodiment of the present invention, a method is provided for determining a gesture. The method includes determining a change in a background of an image from a plurality of images, and determining an object in the image. The method further includes determining a trajectory of the object through the plurality of images, and classifying a gesture according to the trajectory of the object.

Determining the change in the background includes determining a gradient intensity map for the background from a plurality of images, determining a gradient intensity map for the current image, and determining, for a plurality of pixels, a difference between the gradient intensity map and the gradient intensity map for the background. Determining the change in the background further includes determining a comparison between the difference and a threshold, and determining a pixel to be a background pixel according to the comparison.

The object includes a user's hand.

Determining the object in the image includes obtaining a normalized color representation for a plurality of colors in each image, determining from training images an estimate of a probability distribution of normalized color values for an object class, and determining, for each pixel, a likelihood according to an estimated probability density of normalized color values for the object class.

Determining the trajectory of the object through the plurality of images further comprises determining, for each pixel, a temporal likelihood across a plurality of images, and determining a plurality of moments according to the temporal likelihoods.

Determining the trajectory includes determining a difference in a size of the object over a pre-determined time period, determining a plurality of angles between a plurality of lines connecting successive centroids over the time period, and determining a feature vector according to the angles and lines.

The method further includes classifying the feature vector according to a time-delay neural network, wherein a feature is of a fixed length.

Classifying the gesture includes determining a reference point, determining a correspondence between the trajectory and the reference point, and classifying the trajectory according to one of a plurality of commands.

According to an embodiment of the present invention, a method is provided for determining a trajectory of a hand through a plurality of images. The method includes detecting a reference point, updating the reference point as the reference point is varied, and detecting a first translation of the hand through the plurality of images. The method further includes detecting a second translation through the plurality of images, determining a gesture according a vote, and determining whether the gesture is a valid gesture command.

The reference point is not interpreted as a gesture command. The reference point is characterized by hand size and a location of a centroid of the hand in each image.

The first translation is one of a forward and a backward translation, wherein the first translation is characterized by a large change in hand size and a relatively small change in a centroid of the hand. The second translation is one of a left, a right, an up and a down translation.

Detecting the second translation includes determining a normalized vector between two centroids $c_t$ and $c_{t-1}$ as a feature vector, wherein there are three output patterns. The three output patterns are a vertical movement, a horizontal movement, and an unknown. The method further includes comparing the reference point to a centroid upon determining the translation to be a vertical or a horizontal translation, and testing an input pattern upon determining the translation to be an unknown translation. Testing an input pattern further comprises detecting a circular movement, wherein an angle between vector $c_t c_{t-1}$ and vector $c_{t-1} c_{t-2}$ is determined as the feature vector.

The valid gesture is performed continually for a predetermined time.

According to an embodiment of the present invention, a program storage device is provided readable by machine, tangibly embodying a program of instructions executable by the machine to perform method steps for determining a gesture. The method includes determining a change in a background of an image from a plurality of images, determining an object in the image, determining a trajectory of the object through the plurality of images, and classifying a gesture according to the trajectory of the object.

BRIEF DESCRIPTION OF THE DRAWINGS

Preferred embodiments of the present invention will be described below in more detail, with reference to the accompanying drawings.

DETAILED DESCRIPTION OF THE PREFERRED EMBODIMENTS

A system and method for a computer interface detects changes in a background portion of an image, classifies an object of interest based on color properties in the image, and extracts and classifies a gesture feature. The resulting classification results can be used to control a 3D visualization system for medical image data, for example, Fly-Through. This system and method can achieve real-time performance in cluttered background settings. Further, the system and method can be implemented in conjunction with a medical image visualization system or method.

Figure 1:
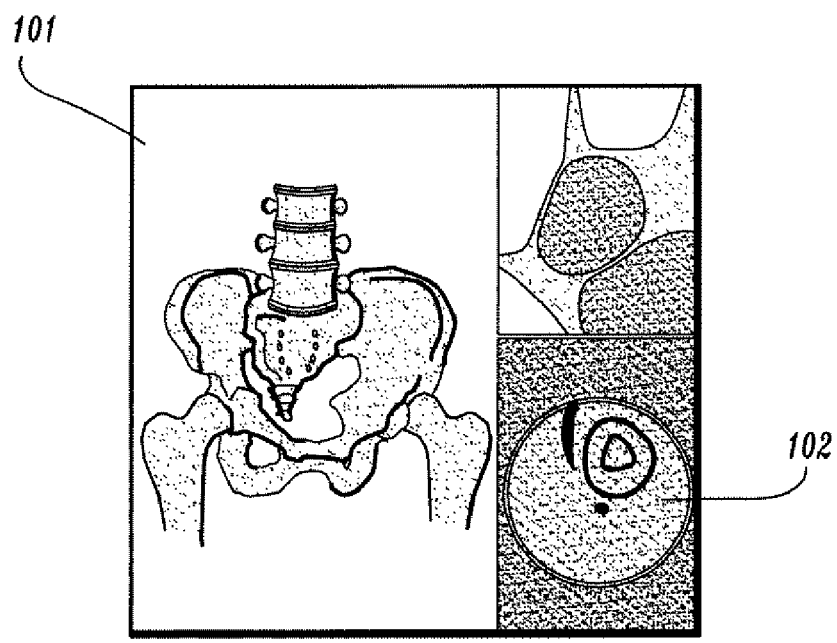
FIG. 1 is a screenshot of the Fly-through visualization tool according to an embodiment of the present invention.

3D Virtuoso is a postprocessing workstation from Siemens that has many 3D tools. One of these tools, Fly-Through, is a dedicated tool for Virtual Endoscopy Simulation. Besides generic 3D rendering capabilities, it has a viewpoint that shows a view of a cavity, for example, a trachea or colon, from a viewpoint inside the body, the virtual endoscope. FIG. 1,is a screenshot of a visualization tool, in this case, Fly-Through, showing a global view of the data 101 as well as a virtual endoscope view 102 from a user defined vantage point.

Figure 2:
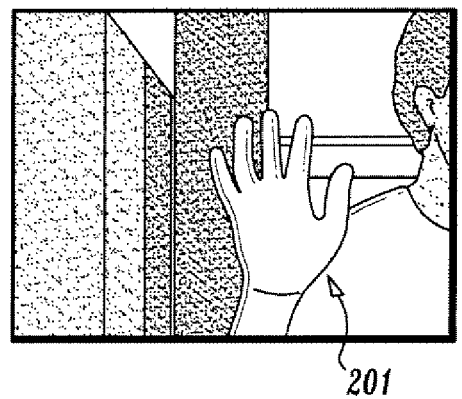
FIG. 2 is an image showing a user's operating hand in an image according to an embodiment of the present invention.

According to an embodiment of the present invention, the system and method can imitate the manipulation of an endoscope. The system and method allow the user to, for example, push, pull, pivot and turn a virtual endoscope. These and other commands can provide gesture recognition. Gestures can include, for example, degrees of translations including left, right, up, down, forward, and backward, and circular movements including clockwise and counterclockwise. Circular movements are viewed as rotations in the gesture interface. As FIG. 2 shows, a camera is fixed in front of a user's hand 201. A valid gesture command needs to be performed continually for a predetermined time to initialize the command. Repetition of a gesture, e.g., more than two times, can be considered as a valid command. For example, to drive the virtual endoscope to the left, the user may wave his hand from right to left, from left to right, and continue this movement until the virtual endoscope moves to the desired position. Thus, a high recognition rate, e.g., 95%, using hand gestures can be obtained.

The design of gestures can be important to a gesture interface. It may not be reasonable to ask a user to keep his/her hand in the visual field of the camera at all times. Also, meaningless hand movements need to be disregarded by the human-machine interface. For example, after performing a gesture, the user may want to move his/her hand out of the camera's field of view to do other operations, e.g., to make an incision. These kinds of hand movements are allowed and the HMI needs to ignore them. After the user initializes a valid gesture command, the system executes the command so long as the gesture continues. For example, the longer a gesture is performed, the larger movement the virtual endoscope makes in the case of Fly-Through.

Consider two valid gesture commands, move left and move right. Both commands may need the user's hand to be waved horizontally and the user can continue this movement as many times as desired. Given no information about where the movement starts, there maybe no way to distinguish between the motion trajectory patterns, e.g., left or right waves. Similar ambiguities can occur when other translations are performed. For this reason, the system and method needs to know or determine a starting point for a gesture command. According to an embodiment of the present invention, by holding the hand stationary before performing a new gesture, the stationary point becomes a reference point. The reference point is used to distinguish among, for example, moving left or right, up or down, and forward or backward.

A gesture command can include various gestures, for example, using the representation of circular movements of a finger or rotating the hand to cause the view to rotate. In this example, drawing circles may be easier for the user than rotating the hand.

Figure 3:
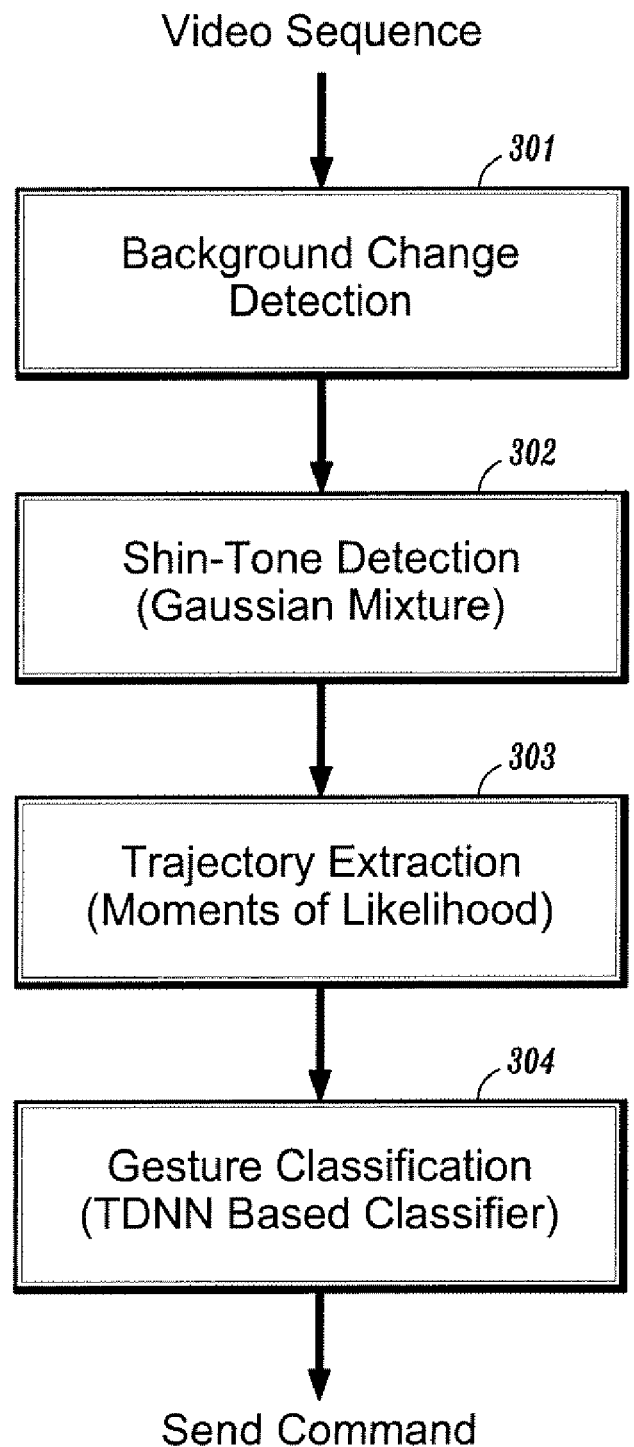
FIG. 3 shows modules of the gesture interface for medical workstations according to an embodiment of the present invention.

Referring to FIG. 3, the method includes detecting changes in the background of a video image in a sequence 301. The method can detect skin-tone of a user according to a Gaussian mixture model 302. A motion trajectory of, for example, the user's hand, can be extracted from the video sequence 303. TDNN based motion pattern classification 304 can be used to classify a hand gesture. The system sends the classification results to, for example, the Fly-Through visualization system.

The system and method can detect changes in a background by determining an intensity of each image from video stream. To eliminate noise, a Gaussian filter can be applied to each image. A gradient map of pixel intensity can be determined. After determining the gradient map of a current image frame, the gradient map is compared with the learned background gradient map. If a given pixel differs less than a threshold between these two gradient maps, the pixel is determined to be a background pixel, and can be marked accordingly. A pre-determined threshold can be used. One with ordinary skill in the art would appreciate, in light of the present invention, that additional methods for selecting the threshold exist, for example, through knowledge of sensor characteristics or through normal illumination changes allowed in the background. According to an embodiment of the present invention the largest area of connected background pixels can be treated as background region.

According to an embodiment of the present invention the largest area of connected background pixels can be treated as background region.

According to an embodiment of the present invention, skin-tone detection can be based on a normalized color model using a learned mixture of Gaussian distributions. The use of normalized colors $$\left(\frac{r}{r+g+b}, \frac{g}{r+g+b}\right)$$

can reduce the variance of skin color in an image. Also, it has been shown that skin color can be modeled by a multivariate Gaussian in HS (hue and saturation) space under certain lighting conditions. In general, for Gaussian mixture model with n components, the conditional probability density for an observation $\chi$ of dimensionality:

$$p(\chi|\theta) = \sum_{i=1}^{n} \pi_i \frac{e^{-1/2(\chi-\mu_i)T\Sigma_i^{-1}(\chi-\mu_i)}}{(2\pi)^{\frac{d}{2}}|\Sigma_i|^{\frac{1}{2}}} \quad (1)$$

where mixing parameter $\pi_i$ corresponds to the prior probability of mixture component i and each component is a Gaussian with mean vector $\mu_i$ and covariance matrix $\Sigma_i$. According to an embodiment of the present invention, skin colors can be modeled in the normalized RG (red and green) space. With learned mean vectors $\mu$, covariance matrix $\Sigma$, and known prior $\pi$, a likelihood is determined for each pixel of the image according to Equation (1) above. According to one embodiment of the present invention, the likelihood of a pixel I(x, y) can be defined as:

$$L(x, y) = \begin{cases} p(\chi|\theta) & \text{if } I(x, y) \in \text{foreground pixel}; \\ 0 & \text{otherwise}. \end{cases} \quad (2)$$

For a foreground pixel with its normalized color observation $\chi$, the likelihood of the pixel is defined as its estimated density. For background pixels, the likelihood values are set to 0. A possible method to select skin pixels is to apply a simple threshold to Equation (2). If the likelihood of a pixel is larger than the threshold, the pixel is then classified as a skin pixel. And the largest skin area of the image is often viewed as the detected skin object.

The trajectory of the centroid of the detected skin object is often used as the motion trajectory of the object. However, it has been determined that there are many objects having skin-like color in an office environment. For example, a wooden bookshelf or a poster on a wall may be misclassified as a skin-like object. Therefore, the system and method attempts to eliminate background pixels as discussed in above. Besides, the skin objects (user's hand and probably the arm) are sometimes split up into two or more blobs. Other skin regions such as face may also appear in the view of the camera. These problems together with non-uniform illumination make the centroid vary dramatically and lead to false detections. For these reasons, a stable motion trajectory is hard to obtain by just finding the largest skin area. To handle these problems, a temporal likelihood can be defined as $L^t(x, y, t)$ of each pixel I(x, y) as:

$$L^t(x,y,t) = \lambda L(x,y) + (1-\lambda)L^t(x,y,t-1) \quad (3)$$

where $\lambda$ is a decay factor. Experiments show that a value of $\lambda$ equal to 0.5 can be used.

To select skin pixels, a threshold $\delta$, is applied to the temporal likelihood $L^t(x, y, t)$ instead of likelihood L(x, y) of each pixel. Thus, the thresholded temporal likelihood of a pixel can be defined as:

$$L^t_\delta(x, y, t) = \begin{cases} L^t(x, y, t) & \text{if } L^t(x, y, t) > \delta; \\ 0 & \text{otherwise}. \end{cases} \quad (4)$$

The moments of the image can be determined as follows:

$$M^t_{00} = \int\int L^t_\delta(x, y, t) dx dy \quad (5)$$

$$M^t_{10} = \frac{\int\int x L^t_\delta(x, y, t) dx dy}{M^t_{00}} \quad (6)$$

$$M^t_{01} = \frac{\int\int y L^t_\delta(x, y, t) dx dy}{M^t_{00}} \quad (7)$$

According to an embodiment of the present invention, $M^{oot}$ is viewed as the size of skin pixels. And ($M_{10}^t$, $M_{01}^t$) is taken to form the motion trajectory. The present invention precisely classifies the user gesture. The system and method provide a reasonable solution to the extraction of trajectories of hand motions.

Recognition of a user's hand motion patterns can be accomplished using TDNN according to an embodiment of the present invention. Experiments show that TDNN has good performance on motion pattern classification. As shown by experiments, TDNN has better performance if the number of output labels was kept small. Another advantage is that a small number of output labels makes networks simple and saves time at network training stage. For these reasons user's gestures are tested hierarchically. Further, TDNN applied hierarchically has been determined to be suitable for the classification of the eight motion patterns described above. For instance, left movement and right movement have the common motion pattern of horizontal hand movement. Thus, once horizontal movement is detected, the range of the motion is compared with the reference point to differentiate these two gestures.

Without introducing the reference point, the neural network has difficulty in discriminating the gestures. The input patterns of the TDNNs have a fixed input length. Since classification is to be performed in real-time as the user moves his hand, the motion patterns are classified along windows in time. At time t, the centroid $c_t$ is obtained as described with respect to motion trajectory extraction.

Suppose the length of an input pattern is w, the feature vectors $\{V_{t-w+1}, V_{y-w+2}, \ldots, V_t\}$ from $\{c_{t-w}, c_{t-w+1}, \ldots, c_t\}$ are extracted to form a TDNN input pattern. When the maximum response from the network is relatively small, as compared with other label responses, the input pattern is classified as an unknown. Some false detections or unknowns are inevitable. False detection can occur when the trajectory of a translation is similar to an arc of a circle. To minimize false detection and obtain stable performance, a fixed number of past results are checked. When more than half of these past results indicate the same output pattern, this output pattern is determined to be a final result. This method has been used to successfully obtain a reliable recognition rate.

Figure 4:
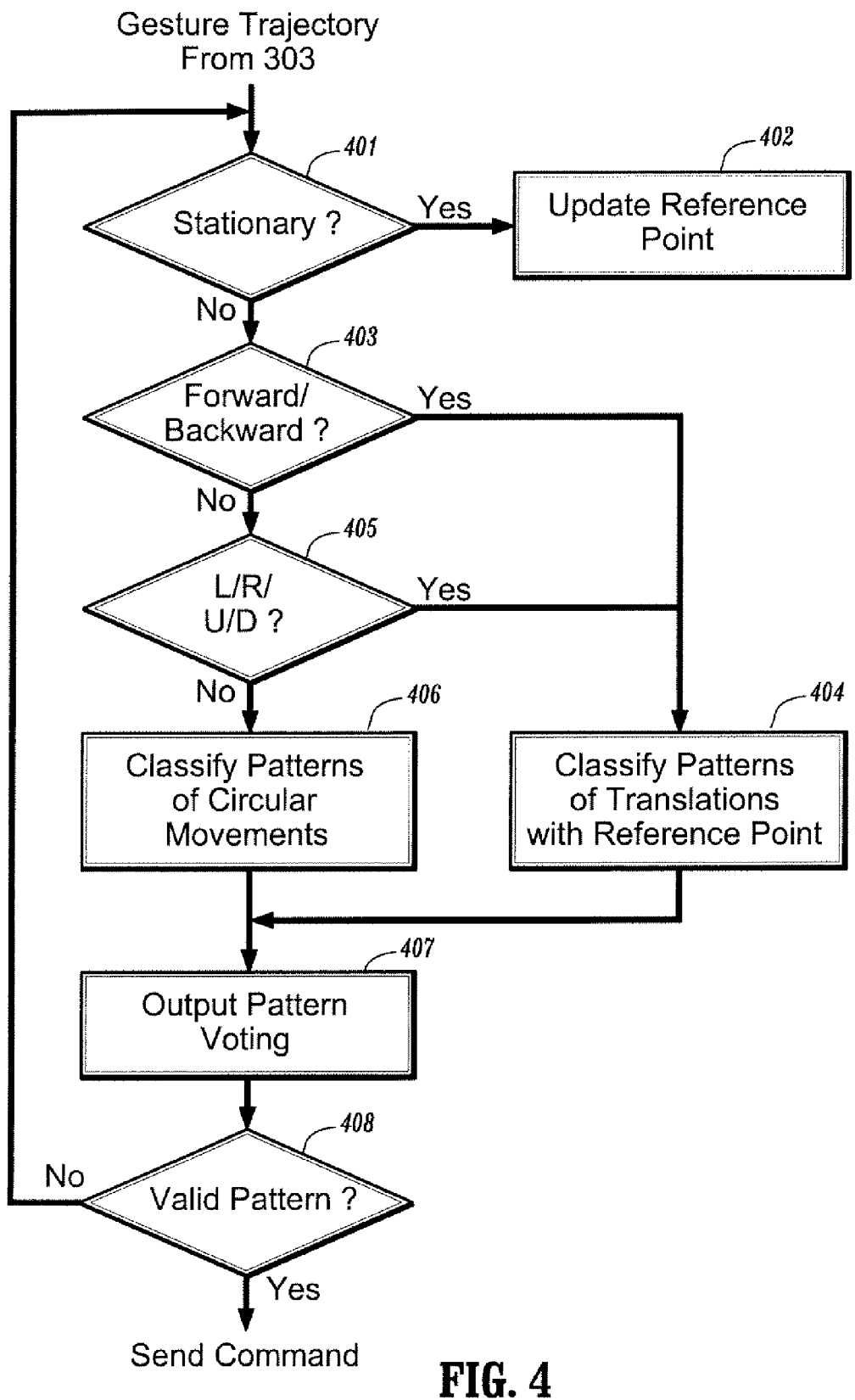
FIG. 4 shows a hierarchy of TDNN based classifier according to an embodiment of the present invention.

FIG. 4 shows a hierarchy of the motion pattern classifier according to an embodiment of the present invention. For the detection of a reference point, when a user keeps his/her hand stationary 401 for a period of time, that is, both size and centroid are almost the same along some time interval, the method detects updates a reference point 402. The reference point will not be interpreted as a gesture command by the system and method.

The method detects forward/backward translations 403. The skin size information obtained from Equation (5) can be used to determine a translation. Since the movement of forward or backward is roughly along the Z-axis of camera, these two translations are characterized by a dramatic change of skin size and subtle change of the centroid of the detected skin region. The estimated size of the hand is compared to the size of the hand when the reference point was initialized to differentiate between a forward and a backward movement.

Further, the method can detect left/right/up/down translations 405. The normalized vector between centroids $c_t$ and $c_{t-1}$ is computed as the feature vector. There are three output patterns: vertical movement, horizontal movement, and unknown. To determine whether a movement is vertical or horizontal, the centroid of the reference point is compared to the centroid currently estimated in the frame. If the result is unknown, e.g., can be a circular movement, the input pattern is tested at the next stage.

For the detection of circular movements, the angle between vector $C_t C_{t-1}$ and vector $c_{t-1} c_{t-2}$ is computed as the feature vector 406. This feature can distinguish between clockwise and counterclockwise circular movements. As expected, user's can draw circles from any position. In particular, a spiral would be classified as one of the circular movements instead of a translation. Referring to FIG. 4, the method can use a voting method 407 to check past results to form meaningful output, the system decreases the possibility of false classification. The method determines whether a given gesture is a valid gesture command 408. A valid gesture needs to be performed continually in some time interval to initialize the command.

Figures 5A, 5B, 5C, 5D:
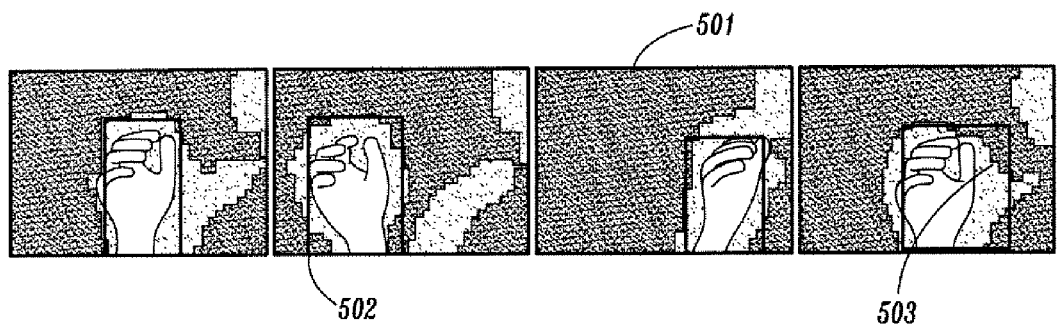
FIGS. 5a–d show an example of a method of discriminating movements according to an embodiment of the present invention.
Figures 6A, 6B, 6C, 6D:
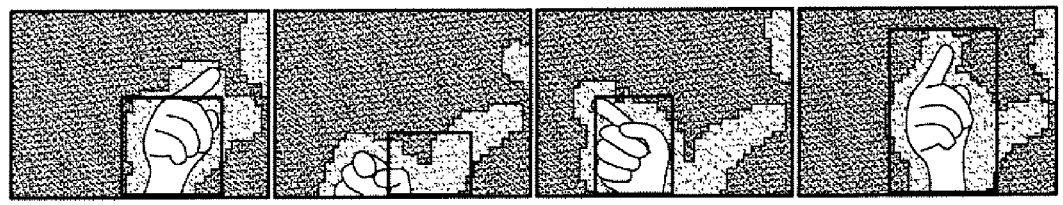
FIGS. 6a–h show an example of a method of determining a hand gesture wherein the hand is not held stationary according to an embodiment of the present invention.
Figures 6E, 6F, 6G, 6H:
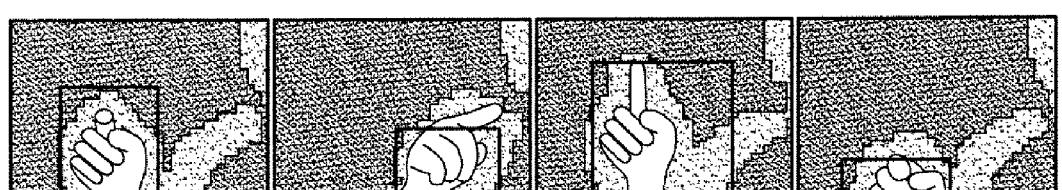

FIGS. 5 and 6 show some examples of our experimental results. In each image, the black region, e.g., 501, is viewed as background. The bounding box, e.g., 502 (highlighted in white in FIG. 5b for clarity), of each image indicates the largest skin area as determined by thresholded likelihood, Equation (4). Note that bounding boxes are only used for display. The arrow(s), e.g., 503, on each bounding box show the classification result. A bounding box with no arrow, for example, as in FIGS. 5a–c, on it means that the gesture is an unknown pattern, or that no movement has occurred, or insufficient data has been collected. Because we classify motion patterns along windows in time, there may be some delay after a gesture is initialized (data is not sufficient for system to make a global decision).

According to an embodiment of the present invention, unintentional movements can be checked using a voting method 407 to check past results to form meaningful outputs, thus, decreasing the possibility of false classification. Further, a user can change gestures without holding his/her hand stationary. For any two gestures, which can be distinguished without new reference point, for example, turn left and then up, or a translation to a circular movement, the user does not need to make hand stationary in between. In tests the system demonstrates a reliable and accurate performance.

A need exists for an intuitive gesture interface for medical imaging workstations. The present invention proposes a real-time system and method that recognizes gestures to drive a virtual endoscopy system. The system and method can classify user's gesture as one of eight defined motion patterns: turn left/right, rotate clockwise/counterclockwise, move up/down, and move in depth in/out. Detecting composite gesture commands on a two-dimension plane need more modification. Besides, current work takes advantage of the fact that some translation patterns are performed along the Z-axis of camera. With only one camera, designing a six degree-of-freedom gesture interface with more flexible camera position needs more research. The system and method have been tested in a laboratory setting and further work is needed to improve the system and to evaluate it in a clinical setting.

Having described embodiments for a system and method for real-time gesture interface for medical workstations, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for automatically remotely issuing commands to a medical imaging workstation comprising the steps of:

determining a change in a background of an image from a plurality of images;

determining an object in the image, identifying a gesture according to a trajectory motion pattern of the object;

determining if the motion pattern corresponds to a valid command by classifying the motion pattern along windows in time; and if the motion pattern corresponds to a valid command, the workstation automatically executing the command resulting in translational and rotational manipulation of a virtual visualization tool based on the command.

2. The method of claim 1, wherein the step of determining the change in the background further comprises the steps of:

determining a gradient intensity map for the background from a plurality of images;

determining a gradient intensity map for the current image;

determining, for a plurality of pixels, a difference between the gradient intensity map and the gradient intensity map for the background;

determining a comparison between the difference and a threshold; and determining a pixel to be a background pixel according to the comparison.

3. The method of claim 1, wherein the object includes a user's hand.

4. The method of claim 1, wherein the step of identifying a gesture further comprises the steps of:

determining a reference point;

determining a correspondence between the trajectory and the reference point; and translating the trajectory according to one of a plurality of commands.

5. The method of claim 1 wherein the step of determining an object in the image further comprising the steps of:

obtaining a normalized color representation for a plurality of colors in each image;

determining from training images an estimate of a probability distribution of normalized color values for an object class; and determining, for each pixel, a likelihood according to an estimated probability density of normalized color values for the object class.

6. The method of claim 1 wherein the step of executing the command further comprises the steps of:

determining the duration of the gesture; and correlating the duration of the gesture to an intensity and scale in which the command is executed.

7. The method of 6 wherein repetition of a command increases the intensity of the corresponding command response.

8. The method of claim 1 wherein the virtual visualization tool is a virtual endoscope.

9. The method of claim 8 wherein the command corresponds to rotation of the virtual endoscope.

10. The method of claim 9 wherein the gesture is rotation of a user's hand.

11. The method of claim 8 wherein the command corresponds to moving the virtual endoscope in a right to left direction.

12. The method of claim 11 wherein the gesture is waving of a user's hand from right to left.

13. The method of claim 1, wherein the step of determining the trajectory of the object through the plurality of images further comprises the steps of:

determining, for each pixel, a temporal likelihood across a plurality of images; and determining a plurality of moments according to the temporal likelihoods.

14. The method of claim 1 wherein the identified gesture is a valid command if it detects object pixels moving in a predefined pattern.

15. A program storage device readable by machine, tangibly embodying a program of instructions executable by the machine to perform method steps for automatically remotely issuing commands to a medical imaging workstation, the method steps comprising:

determining a change in a background of an image from a plurality of images;

determining an object in the images;

identifying a gesture according to a trajectory and motion pattern of the object;

determining if the motion pattern corresponds to a valid command by classifying the motion pattern along window in time; and if the motion pattern corresponds to a valid command, the workstation automatically executing the command resulting in translational and rotational manipulation of a virtual visualization tool based on the command.

16. The method of claim 15, wherein the step of determining the change in the background further comprises the steps of:

determining a gradient intensity map for the background from a plurality of images;

determining a gradient intensity map for the current image;

determining, for a plurality of pixels, a difference between the gradient intensity map and the gradient intensity map for the background;

determining a comparison between the difference and a threshold; and determining a pixel to be a background pixel according to the comparison.

17. The method of claim 15, wherein the object includes a user's hand.

18. The method of claim 15, wherein the step of identifying a gesture further comprises the steps of:

determining a reference point;

determining a correspondence between the trajectory and the reference point; and translating the trajectory according to one of a plurality of commands.

19. The method of claim 15, wherein the step of determining the object in the image further comprises the steps of:

obtaining a normalized color representation for a plurality of colors in each image;

determining from training images an estimate of a probability distribution of normalized color values for an object class; and determining, for each pixel, a likelihood according to an estimated probability density of normalized color values for the object class.

* * * * *